United States Patent
Stählin et al.

(10) Patent No.: US 9,429,985 B2
(45) Date of Patent: Aug. 30, 2016

(54) METHOD OF REDUCING A TOTAL COMPUTATION CAPACITY THAT NEEDS TO BE KEPT, VEHICLE-TO-X COMMUNICATION APPARATUS AND USE OF THE VEHICLE-TO-X COMMUNICATION APPARATUS

(71) Applicant: Continental Teves AG & Co. oHG, Frankfurt (DE)

(72) Inventors: Ulrich Stählin, Eschborn (DE); Enno Kelling, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/762,866

(22) PCT Filed: Jan. 22, 2014

(86) PCT No.: PCT/EP2014/051228
§ 371 (c)(1),
(2) Date: Jul. 23, 2015

(87) PCT Pub. No.: WO2014/118055
PCT Pub. Date: Aug. 7, 2014

(65) Prior Publication Data
US 2015/0355674 A1 Dec. 10, 2015

(30) Foreign Application Priority Data

Jan. 30, 2013 (DE) .................. 10 2013 201 481

(51) Int. Cl.
*G06F 1/14* (2006.01)
*G07C 5/02* (2006.01)
(Continued)

(52) U.S. Cl.
CPC ............... *G06F 1/14* (2013.01); *G06F 1/324* (2013.01); *G06F 9/4893* (2013.01);
(Continued)

(58) Field of Classification Search
CPC .... G06F 1/324; G06F 9/4893; G06F 9/5094; G06F 1/14; H04L 67/12; Y02B 60/142; Y02B 60/144; Y02B 60/1217; G07C 5/02; G08G 1/01; G08G 1/161
See application file for complete search history.

(56) References Cited

U.S. PATENT DOCUMENTS 8,451,812 B2  5/2013  Stahlin
8,909,927 B2  12/2014 Falk
(Continued)

FOREIGN PATENT DOCUMENTS

DE  102008060231  6/2009
DE  102007053255  9/2009
(Continued)

OTHER PUBLICATIONS

German Search Report for German Application No. 10 2013 201 481.3 mailed Nov. 6, 2013, including partial translation.
(Continued)

*Primary Examiner* — Yuen Wong
(74) *Attorney, Agent, or Firm* — RatnerPrestia

(57) ABSTRACT

A method for reducing a total computation capacity that needs to be kept, in which an electronic computation module of a vehicle system keeps the total computation capacity, wherein a multiplicity of software modules are executed by the electronic computation module, wherein the software modules take up computation capacity for data processing processes and for input data checking processes and wherein the input data checking processes are repeated in accordance with clocking. The method is distinguished in that the clocking is adjustable. Furthermore, the invention relates to a vehicle-to-x communication apparatus and to a use of the vehicle-to-x communication apparatus.

11 Claims, 2 Drawing Sheets

(51) Int. Cl.
  *G08G 1/01*  (2006.01)
  *G06F 1/32*  (2006.01)
  *G06F 9/48*  (2006.01)
  *G06F 9/50*  (2006.01)
  *H04L 29/08*  (2006.01)
  *G08G 1/16*  (2006.01)

(52) U.S. Cl.
  CPC ............ *G06F 9/5094* (2013.01); *G07C 5/02* (2013.01); *G08G 1/01* (2013.01); *H04L 67/12* (2013.01); *G08G 1/161* (2013.01); *Y02B 60/1217* (2013.01); *Y02B 60/142* (2013.01); *Y02B 60/144* (2013.01)

(56) References Cited

U.S. PATENT DOCUMENTS

| | | | | |
|---|---|---|---|---|
| 2011/0140968 | A1* | 6/2011 | Bai | G08G 1/163 342/454 |
| 2012/0065841 | A1 | 3/2012 | Nagata | |
| 2014/0020098 | A1* | 1/2014 | Stahlin | G08G 1/163 726/22 |
| 2014/0143834 | A1 | 5/2014 | Stahlin | |
| 2014/0366035 | A1* | 12/2014 | Yasuda | G06F 9/5083 718/105 |

FOREIGN PATENT DOCUMENTS

| | | |
|---|---|---|
| DE | 102010002092 | 12/2010 |
| DE | 102010023540 | 12/2011 |
| DE | 102012204880 | 10/2012 |
| DE | 102011078704 | 1/2013 |
| WO | WO2013121545 A1 * | 8/2012 |

OTHER PUBLICATIONS

Glas, B., et al., "Car-to-Car Communication Security on Reconfigurable Hardware," Apr. 26, 2009, pp. 1-5, 2009 IEEE 69th Vehicular Technology Conference.

International Search Report for International Application No. PCT/EP2014/051228 mailed Apr. 17, 2014.

Krishnan, H., "Verify-on-Demand—A practical and scalable approach for broadcast authentication in vehicle safety communication," Oct. 2008, pp. 1-9, The IP.com Journal, IP.com Inc., West Henrietta, NY.

Raya, M., et al., "Securing Vehicular Communications," Oct. 31, 2006, pp. 8-15, vol. 13, No. 5, IEEE Wireless Communications, Piscataway, NJ.

* cited by examiner

METHOD OF REDUCING A TOTAL COMPUTATION CAPACITY THAT NEEDS TO BE KEPT, VEHICLE-TO-X COMMUNICATION APPARATUS AND USE OF THE VEHICLE-TO-X COMMUNICATION APPARATUS

CROSS REFERENCE TO RELATED APPLICATIONS

This application is the U.S. National Phase Application of PCT International Application No. PCT/EP2014/051228, filed Jan. 22, 2014, which claims priority to German Patent Application No. 10 2013 201 481.3, filed Jan. 30, 2013, the contents of such applications being incorporated by reference herein.

FIELD OF THE INVENTION

The invention relates to a method for reducing a total computation capacity to be kept, a vehicle-to-X communication apparatus, and use thereof.

BACKGROUND OF THE INVENTION

Vehicle-to-X communication systems which are designed both for the transmission of traffic-related data and for the transmission of various service data, such as weather data, are known in the prior art. Vehicle-to-X communication is based not only on the data exchange between vehicles themselves (vehicle-to-vehicle communication), but also on the data exchange between vehicles and infrastructure facilities (vehicle-to-infrastructure communication). Since the complete electronic processing of all vehicle-to-X messages received by a vehicle is associated with a comparatively substantial computation overhead which is often unfeasible on cost grounds, filter methods are already known by means of which the received vehicle-to-X messages are initially preprocessed.

In this context, DE 10 2008 060 231 A1 which is incorporated by reference, describes a method for selecting different data transmitted by means of vehicle-to-X communication. By means of a data frame, the received data are distinguished by a data filter in the receive device and, for example, are forwarded to a driver assistance system or to an entertainment device. This enables a sorting of the received data before their actual processing. Transceiver devices based on the WLAN standard 802.11a/b/g/n/p are used to transmit the data. DE 10 2010 002 092 A1 which is incorporated by reference, describes a data processing for received vehicle-to-X messages which precedes a forwarding of the messages to the associated applications and systems in the vehicle and their processing by these applications and systems. The data processing may comprise the checking of a data security level of the message and may additionally perform a data reduction. The data reduction causes information relating to specific objects or situations to be hidden and accordingly not forwarded and processed. Thus, for example, information relating to objects that are too far away from the receiving vehicle and information relating to objects that will be reached by the vehicle only after a specific time period are not taken into account. Similarly, many locally close objects with essentially identical behavior are summarized into a situation, e.g. a tailback. The exclusive consideration of objects which are located in the proposed movement envelope of the vehicle is also possible. The data volume to be processed by the individual applications can thereby be significantly reduced.

DE 10 2012 204 880 A1 which is incorporated by reference, discloses a method for reducing the computation load in a data security check of data packets received by means of vehicle-to-X communication. Here, the data security check consists in the checking of a signature encrypted by means of cryptographic algorithms, which is associated with a substantial computation overhead and requires the use of dedicated electronics. To reduce the computation load, a preprocessing of the received vehicle-to-X messages is first carried out which prioritizes said messages into different categories. The prioritization can be carried out on the basis of different criteria, such as e.g. the distance between the transmitter and receiver or TTC (time to collision) of the transmitter in relation to the receiver. Only the signatures of data packets provided with high priority are initially checked. If free computation capacity is subsequently still available, further data packets are checked. Similarly, the possibility is described of verifying the content of a data packet by means of environment sensor data, as a result of which a computation-intensive checking of the signature can be foregone.

SUMMARY OF THE INVENTION

However, it is disadvantageous in the vehicle-to-X communication methods known in the prior art that said methods seek to achieve a reduction in the computation capacity that needs to be provided for the vehicle-to-X communication exclusively via a prefiltering of the vehicle-to-X messages to be processed or a reduction in the data volume to be processed. However, the possibilities for reducing the computation capacity that needs to be provided are therefore restricted to aspects prior to the actual processing.

Accordingly, an aspect of the present invention proposes a method which enables an additional reduction in the computation capacity that needs to be provided, independently from known preprocessing methods and prefiltering methods.

An aspect of the invention relates to a method for reducing a total computation capacity to be kept in which an electronic computation module of a vehicle system keeps the total computation capacity, wherein a multiplicity of software modules are executed by the electronic computation module, wherein the software modules take up computation capacity for data processing processes and for input data checking processes and wherein the input data checking processes are repeated in accordance with a timing. The method is characterized in that the timing is adjustable.

The software modules may be different computer program products which are executed temporally in parallel on the computation module. Each of the software modules executes data processing processes, insofar as data to be processed are available for this software module. The computation capacity required for the data processing processes is therefore dependent on the type and number of the data to be processed and is taken up as required by the respective software module in the computation module. In addition, each software module takes up computation capacity for the input data checking process associated with the software module. The input data checking process is typically executed several times per second for each software module and represents a checking of the available data to be processed in order to determine whether the available data to be processed are relevant to the checking software module and are therefore to be processed by the latter. The input data checking process also requires computation capacity which is similarly taken up by the software module in the computation module.

An aspect of the invention now results in the advantage that the computation capacity necessary for the input data checking processes can be adjusted via the adjustable timing which specifies the time interval between two consecutive input data checking processes. The total computation capacity that is kept can thus be used and distributed more flexibly. For example, computation capacity can be temporarily withdrawn from the input data checking processes and can be made available to the ongoing data processing processes. The total computation capacity that needs to be kept can therefore also be reduced. This in turn enables a cost saving, since a less powerful and therefore less costly computation module can be used.

It is preferably provided that the timing is adjusted depending on a computation utilization of the computation module. Computation utilization is understood in the sense of the invention to mean the ratio of the computation capacity taken up by the software modules to the total computation capacity. The computation utilization normally increases or decreases essentially depending on the data volume to be processed by the data processing processes. Through the adjustment of the timing depending on the computation utilization, the advantage is therefore produced that a flexible response can be made to the respective requirements in terms of the computation capacity taken up.

It is particularly preferably provided that the timing is lengthened with an increasing computation utilization and is shortened with a decreasing computation utilization. The lengthening or shortening can be effected according to a predefined relationship. This relationship may, for example, be linear, gradual in the event that threshold values are exceeded or understepped, or a combination of both. However, any other predefinable relationship is similarly possible. The lengthening of the timing with an increasing computation utilization and the shortening of the timing with a decreasing computation utilization offers the advantage that computation capacity can be transferred according to requirements from the data processing processes to the input data checking processes or vice versa. The lengthening of the timing corresponds to a reduction in the computation capacity required by the input data checking processes, since the time interval between two consecutive input data checking processes is lengthened.

Furthermore, it is particularly preferred that, in the event of a predefinable computation utilization being exceeded, the timing of one or more input data checking processes is stopped and the one or more input data checking processes are triggered in an event-dependent manner. This clearly corresponds to a lengthening of the timing to "infinite". An individual or a plurality of consecutive input data checking processes are executed only when specific events occur. Due to the stopping of the input data checking processes, even further computation capacity can be withdrawn from the input data checking processes and can be made available to the data processing processes.

It is furthermore appropriate for each software module to have an individual timing for its input data checking process, wherein the individual timing is, in particular, individually adjustable. The method according to the invention thus enables a particularly flexible distribution of the total computation capacity among the individual software modules and processes.

It is advantageous that the vehicle system is a vehicle-to-X communication apparatus, particularly in a motor vehicle. A comparatively high cost pressure normally prevails specifically in the motor vehicle industry. The method according to the invention simply enables a reduction in the necessary cost overhead.

In particular, it is advantageous that the vehicle-to-X communication apparatus transmits and receives vehicle-to-X messages by means of at least one of the following connection types:
WLAN connection, in particular according to IEEE 802.11p,
Wi-Fi Direct,
ISM connection (Industrial, Scientific, Medical Band), in particular via a radio-connection-enabled locking device,
Bluetooth connection
ZigBee connection
UWB connection (Ultra Wide Band),
WiMax (Worldwide Interoperability for Microwave Access)
remote keyless entry connection
radio-connection-enabled locking device
mobile radio connection, in particular GSM, GPRS, EDGE, UMTS and/or LTE connections, and
infrared connection.

These connection types offer different advantages, depending on the type, wavelength and data protocol used. Some of the aforementioned connection types thus enable, for example, a comparatively high data transfer rate and a comparatively fast connection set-up, whereas others are largely very well-suited to data transmission around visibility obstacles. The combination and simultaneous or parallel use of a plurality of these connection types produce further advantages, since disadvantages of individual connection types can thus also be cancelled out.

It is furthermore preferred that the software modules process received vehicle-to-X messages. This similarly helps to reduce the necessary cost overhead for vehicle-to-X communication apparatus in the motor vehicle industry for the aforementioned reasons.

It is advantageously provided that the timing is adjusted on an event-dependent basis when at least one of the following events occurs:
presence of at least a predefined number of objects in a predefined area (12, 13, 14),
presence of at least one predefined type of objects in a predefined area (12, 13, 14),
exceeding of a predefined speed of the motor vehicle (11),
wherein the objects are road users and/or infrastructure facilities.

The aforementioned events in each case represent situations which may require the execution of one or more input data checking processes. The predefined areas may, in the simplest case, describe a constant circular area around the vehicle. Similarly, the predefined areas may also be adjusted depending on the speed of the vehicle or depending on the alignment or direction of travel of the motor vehicle. For example, the predefined area may be larger in the direction of travel of the vehicle than the area behind the vehicle. Types of objects that may require the execution of one or more input data checking processes are e.g. emergency vehicles or police vehicles in action, and also traffic lights. It should furthermore be emphasized that the aforementioned areas predefined in connection with the number of objects may be independent from the aforementioned areas predefined in connection with the object type.

It is preferably provided that the software modules are sorted in a predefined priority sequence, wherein the timings of the input data checking processes of comparatively low-prioritized software modules can be lengthened or stopped if comparatively more highly prioritized software modules take up additional computation capacity. This offers the advantage that comparatively more highly prioritized software modules always receive the required computation capacity.

In particular, it is provided that the software modules are sorted in the predefined priority sequence according to their safety-critical importance for the vehicle. It is thus guaranteed that specifically the safety-critical software modules always receive the required computation capacity and can therefore always operate reliably.

It is furthermore provided that the method is preceded by a method of prefiltering received vehicle-to-X messages and/or by a data volume reduction of received vehicle-to-X messages. This offers the advantage that the computation capacity is even further reduced initially by means of the prefiltering method known per se or the data volume reduction known per se and subsequently by means of the method according to the invention. An extensive reduction in the computation utilization can be achieved by this combination.

In particular, it is provided that the events are recognized by means of the prefiltering method. Since the prefiltering method known per se in any case analyzes and sorts the data to be processed, in particular the received vehicle-to-X messages, this prefiltering method can be used without generating additional computation overhead to recognize an event which requires the execution of one or more input data checking processes.

It is furthermore preferred that a lower limit value and/or an upper limit value are predefined for the individual timing. A framework within which the timing is modifiable can thus be defined for each software module independently from the actual computation utilization. This guarantees, for example even with a very high computation utilization, that an input data checking process of a specific software module is nevertheless executed with a specific timing which corresponds to the corresponding limit value.

An aspect of the invention furthermore relates to a vehicle-to-X communication apparatus which comprises at least one electronic computation module, an electronic storage device and a transceiver module, wherein the electronic computation module keeps a predefined maximum computation capacity, wherein the computation module executes a multiplicity of software modules stored in the electronic storage device, wherein the software modules take up computation capacity for data processing processes and for input data checking processes and wherein the computation module repeats the input data checking processes according to a timing. The vehicle-to-X communication apparatus is characterized in that the vehicle-to-X communication apparatus furthermore comprises means for adapting the timing and carries out the method according to the invention. This offers the advantages already described.

An aspect of the invention furthermore relates to a use of the vehicle-to-X communication apparatus according to the invention in a motor vehicle.

BRIEF DESCRIPTION OF THE DRAWINGS

Further preferred embodiments can be found in the subclaims and in the following description of an example embodiment with reference to figures.

In the figures.

DETAILED DESCRIPTION OF THE PREFERRED EMBODIMENTS

Figure 1:
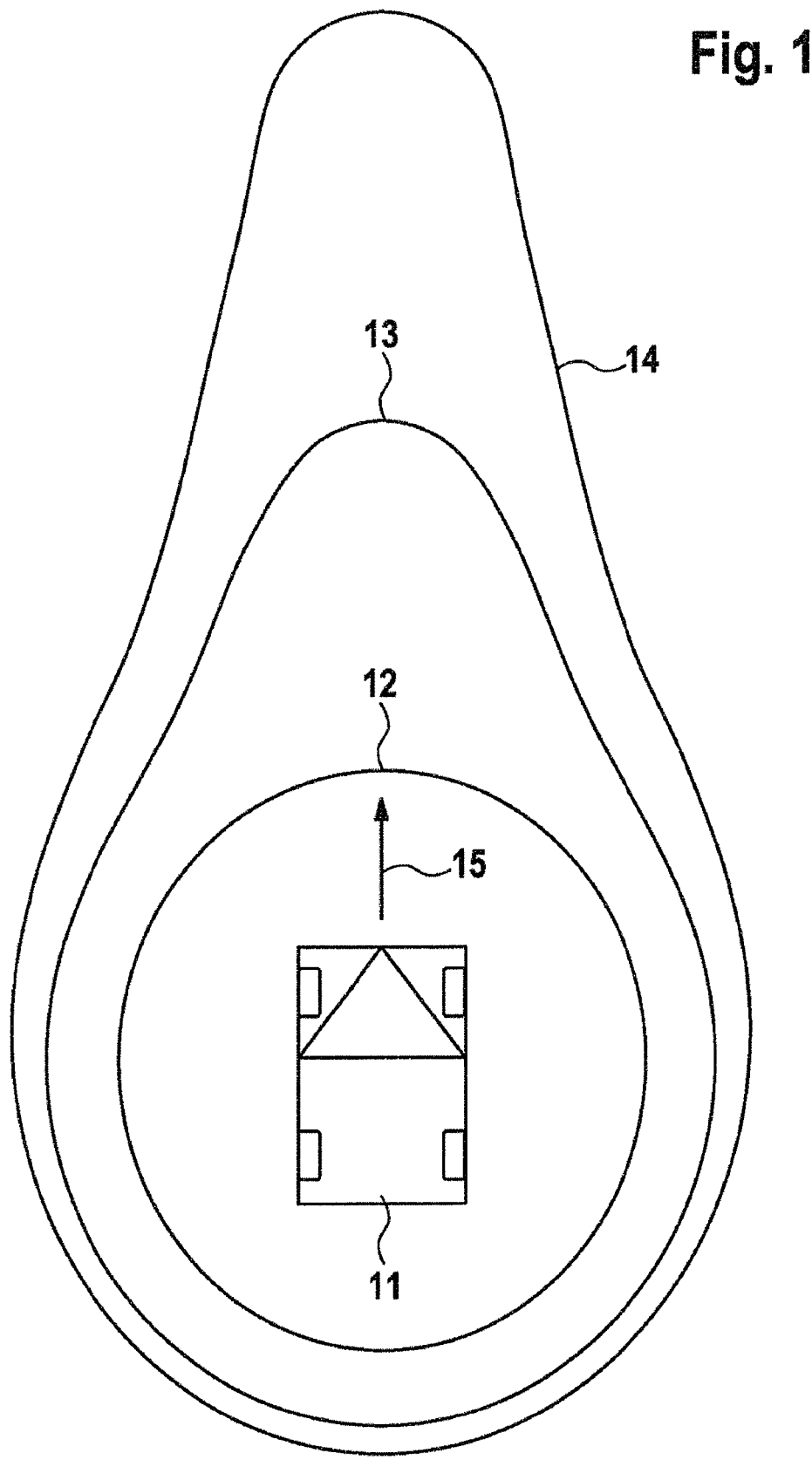
FIG. 1 shows an example of a predefined area around a motor vehicle, said area changing in a speed-dependent manner.

FIG. 1 shows a motor vehicle 11 which is equipped with a vehicle-to-X communication apparatus according to the invention, wherein the vehicle-to-X communication apparatus carries out the method according to the invention in order to reduce a total computation capacity to be kept. The motor vehicle 11 moves in the direction of the arrow 15. By means of a prefiltering method known per se, all received vehicle-to-X messages are initially analyzed, wherein vehicle-to-X messages recognized as irrelevant are discarded and accordingly not further processed. This prefiltering method precedes the execution of the method according to the invention. Predefined areas 12, 13 and 14 (not drawn to scale) can be seen around the motor vehicle 11, wherein areas 12, 13 and 14 are selected in a speed-dependent manner. The area 12 is selected at speeds below 15 km/h, the area 13 at speeds between 15 km/h and 50 km/h and the area 14 at speeds above 50 km/h. Since an electronic computation unit of the vehicle-to-X communication apparatus in the motor vehicle 11, for example, temporarily has a very high computation utilization, the input data checking processes of two software modules are temporarily stopped. More computation capacity is thus available for the data processing processes. The two software modules are a traffic light phase assistant and a congestion warning system. Since the motor vehicle 11 is moving at a speed of 55 km/h, the area 14 is monitored for the occurrence of events which trigger the execution of an input data checking process of one of the two aforementioned software modules (traffic light phase assistant and congestion warning system). This monitoring is effected by means of the prefiltering method. Since five further motor vehicles (not shown) are now recognized in the area 14, an input data checking process of the congestion warning system is executed and repeated with a timing of one repetition per second until the number of motor vehicles in the area 14 again decreases.

Figure 2:
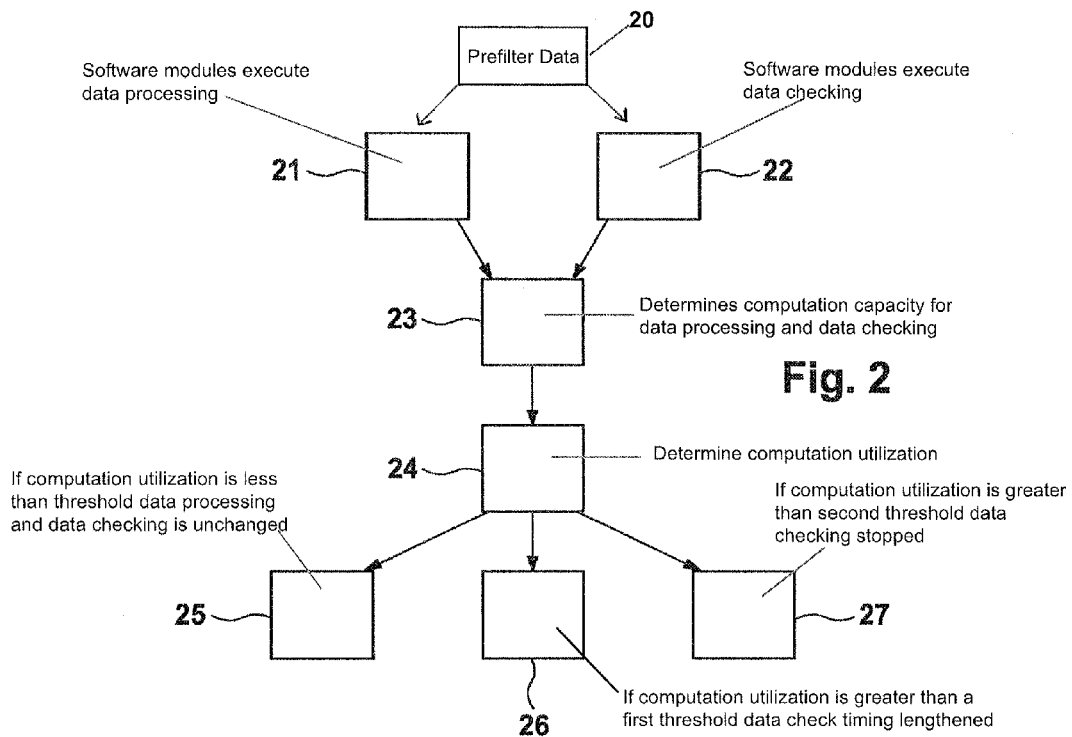
FIG. 2 shows a flow diagram of a possible sequence of the method according to the invention.

FIG. 2 shows a flow diagram of a possible sequence of the method according to the invention. In method step 20, the received data is prefiltered. In method step 21, a multiplicity of software modules take up computation capacity from an electronic computation module in order to execute data processing processes on the prefiltered data. The multiplicity of software modules simultaneously takes up computation capacity in order to execute input data checking processes in step 22. The electronic computation unit makes the required computation capacity for both the data processing processes and the input data checking processes available in step 23. The computation module determines its computation utilization in the following step 24. Depending on the result of the determination of the computation utilization in step 24, either step 25, step 26 or step 27 is executed. Insofar as it was recognized in step 24 that the computation utilization lies below a threshold value, both the data processing processes and the input data checking processes are executed unchanged in step 25. However, if it was recognized in step 24 that the computation utilization has exceeded a first threshold value, the timing of the software modules executed on the computation module is lengthened in step 26 in order to save computation capacity in the execution of the input data checking processes and make this capacity available to the data processing processes. If it was established in step 24 that the computation utilization has even exceeded a second threshold value, the timings of five software modules sorted in a predefined priority sequence and given a comparatively low priority are stopped completely in step 27. This saves additional computation capacity which can then be made available to the data processing processes.

Figure 3:
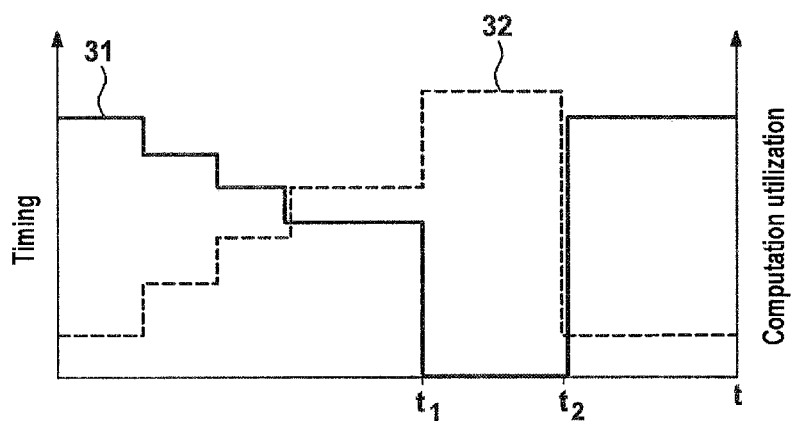
FIG. 3 shows an adjustment of the timing of an input data checking process of a software module depending on the computation utilization of the computation module.

FIG. 3 shows schematically the timing of an input data checking process of the software module (curve 31, unbroken line) depending on the computation utilization of the computation module (curve 32, dotted line) over the time t. As can be seen, the input data checking process initially has a comparatively short timing, i.e. it is repeated at comparatively short time intervals. Simultaneously, the computation utilization of the computation module is initially comparatively low. With advancing time t, the computation utilization of the computation module increases gradually. In order to counteract this increase in the computation utilization, the timing of the input data checking process of the software module is lengthened to the same extent. At the time $t_1$, the computation utilization finally increases abruptly once more, and for this reason the timing is then stopped. At the time $t_2$, the computation-load-intensive data processing processes which were responsible for the increase in the computation utilization are concluded. The timing is reduced accordingly once more to the original value.

The invention claimed is:

1. A method for keeping a computation utilization of a total computation capacity in a vehicle system of a motor vehicle in vehicle-to-X communication, the method comprising:
   executing, by an electronic computation device in the motor vehicle, a multiplicity of software modules on received data;
   determining, by the electronic computation device, a consumption of computation utilization of computation capacity by at least one of the multiplicity of software modules in performing data processing of the received data;
   determining, by the electronic computation device, a consumption of computation utilization of computation capacity by at least another one of the multiplicity of software modules in performing input data checking of the received data at a periodic interval of a timing;
   estimating, by the electronic computation device, the computation utilization of the total computation capacity based on a sum of the consumption of computation utilization of computation capacity during the data processing of the data processing of the received data and the input data checking of the received data;
   controlling, by the electronic computation device, the periodic interval of the timing by one of:
      a) maintaining the periodic interval of the timing when the computation utilization of the total computation capacity is less than a first threshold of computation utilization, to maintain the computation utilization of computation capacity consumed by performing the input data checking, and
      b) increasing the periodic interval of the timing when the computation utilization of the total computation capacity is greater than the first threshold of computation utilization, to reduce the computation utilization of computation capacity consumed by performing the input data checking; and
   stopping, in response to a predefinable computation utilization being exceeded, the periodic interval of the timing of one or more input data checking processes when the one or more input data checking processes is triggered in an event-dependent basis, wherein the event-dependent basis is based on the vehicle-to-X communication between the motor vehicle and at least one pre-defined object in a predefined area around the motor vehicle.

2. The method as claimed in claim 1, wherein each software module has an individual periodic interval of timing for the input data checking process, wherein the individual periodic interval of timing is individually adjustable.

3. The method as claimed in claim 2, wherein a lower limit value and/or an upper limit value are predefined for the individual periodic interval of timing.

4. The method as claimed in claim 1, wherein the vehicle system is a vehicle-to-X communication apparatus in the motor vehicle.

5. The method as claimed in claim 4, wherein the multiplicity of software modules process received vehicle to-X messages.

6. The method as claimed in claim 1, wherein the event-dependent basis is an occurrence of at least one of:
   presence of at least a predefined number of objects in the predefined area,
   presence of the at least one predefined object in the predefined area, and
   exceeding of a predefined speed of the motor vehicle,
   wherein the at least one predefined object are road users and/or infrastructure facilities.

7. The method as claimed in claim 1, wherein the multiplicity of software modules are sorted in a predefined priority sequence, wherein timings of the input data checking processes of comparatively low-prioritized software modules are lengthened or stopped in response to comparatively more highly prioritized software modules taking up additional computation capacity.

8. The method as claimed in claim 7, wherein the multiplicity of software modules are sorted in the predefined priority sequence according to safety-critical importance of respective software modules for the vehicle.

9. The method as claimed in claim 1, wherein the data checking step is preceded by a method of prefiltering received vehicle-to-X messages and/or by a data volume reduction of received vehicle-to-X messages.

10. The method as claimed in claim 9, the event-dependent basis is recognized by the prefiltering method.

11. A vehicle-to-X communication apparatus for keeping a computation utilization of a total computation capacity in a vehicle system of a motor vehicle in vehicle-to-X communication, the vehicle-to-X communication apparatus comprising:
   at least one electronic computation device;
   an electronic storage device storing a multiplicity of software modules; and
   a transceiver device;
   wherein the electronic computation device is configured to:
      execute the multiplicity of software modules stored in the electronic storage device on received data received through the transceiver device, determine a consumption of computation utilization of computation capacity by at least one of the multiplicity of software modules in performing data processing of the received data, determine a consumption of computation utilization of computation capacity by at least another one of the multiplicity of software modules in performing input data checking of the received data at a periodic interval of timing, estimate the computation utilization of the total computation capacity based on a sum of the consumption of computation utilization of computation capacity during the data processing of the data processing of the received data and the input data checking of the received data, control the periodic interval for performing input data checking by one of:
 a) maintaining the periodic interval of the timing when the computation utilization of the total computation capacity is less than a threshold of computation utilization, to maintain the computation utilization of computation capacity consumed by performing the input data checking, and
 b) increasing the periodic interval of the timing when the computation utilization of the total computation capacity is greater than the threshold of computation utilization, to reduce the computation utilization of computation capacity consumed by performing the input data checking, and stop, in response to a predefinable computation utilization being exceeded, the periodic interval of the timing of one or more input data checking processes when the one or more input data checking processes is triggered in an event-dependent basis, wherein the event-dependent basis is based on the vehicle-to-X communication between the motor vehicle and at least one pre-defined object in a predefined area around the motor vehicle.

* * * * *